(12) United States Patent
Mast

(10) Patent No.: US 11,062,391 B2
(45) Date of Patent: Jul. 13, 2021

(54) DATA STREAM PROCESSING FRAMEWORK

(75) Inventor: Jason Mast, Algonquin, IL (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 12/885,122

(22) Filed: Sep. 17, 2010

(65) Prior Publication Data
US 2012/0072368 A1   Mar. 22, 2012

(51) Int. Cl.
*G06Q 40/04*   (2012.01)
*G06Q 40/06*   (2012.01)

(52) U.S. Cl.
CPC .......... *G06Q 40/04* (2013.01); *G06Q 40/06* (2013.01)

(58) Field of Classification Search
CPC ........ G06Q 40/04; G06Q 30/08; G06Q 40/06; G06Q 40/00; G06F 9/546; G06F 2209/547; H04L 47/829; H04L 67/26
USPC ..................................................... 705/35–45
See application file for complete search history.

(56) References Cited

U.S. PATENT DOCUMENTS

| | | | | |
|---|---|---|---|---|
| 5,737,758 A | * | 4/1998 | Merchant | G06F 12/0831 711/146 |
| 5,987,432 A | * | 11/1999 | Zusman | G06Q 40/00 705/35 |
| 6,278,982 B1 | * | 8/2001 | Korhammer | G06Q 40/04 705/36 R |
| 6,343,278 B1 | * | 1/2002 | Jain et al. | 705/36 R |
| 6,725,446 B1 | * | 4/2004 | Hahn | G06F 16/958 717/103 |
| 7,617,148 B2 | * | 11/2009 | Breslow | G06Q 40/00 705/37 |
| 7,624,063 B1 | | 11/2009 | Andrews | |
| 7,720,742 B1 | * | 5/2010 | Mauro | G06Q 40/00 705/37 |
| 7,882,008 B2 | * | 2/2011 | Mahajan | G06Q 30/0601 705/37 |
| 7,904,363 B2 | * | 3/2011 | Wu | G06Q 30/00 705/35 |
| 7,921,046 B2 | * | 4/2011 | Parsons | G06Q 40/00 705/35 |
| 8,073,925 B2 | * | 12/2011 | Wheeler | G06Q 10/087 709/202 |
| 8,090,803 B2 | * | 1/2012 | Payne | G08B 25/085 709/219 |
| 8,200,775 B2 | * | 6/2012 | Moore | G06F 17/3089 709/217 |

(Continued)

OTHER PUBLICATIONS

Anonymous, "D: Real-Time aggregate datafeeds", Inside Market Data Reference: IMD Reference (2009), pp. 1-21.*

(Continued)

*Primary Examiner* — Mohammad Z Shaikh
(74) *Attorney, Agent, or Firm* — Stephen J. Walder, Jr.; Anthony V. England

(57) ABSTRACT

Method and apparatus for interfacing middleware applications with a financial market snapshot feed. Financial market data are retrieved from the snapshot feed and the retrieved data are stored in transactions. Prior to transmitting the financial market data to the middleware, the transactions are processed in order to determine value/added information. For example, errors in the financial market data may be determined or additional financial data may be calculated.

23 Claims, 4 Drawing Sheets

(56) References Cited

U.S. PATENT DOCUMENTS

| | | | | |
|---|---|---|---|---|
| 8,204,817 | B2* | 6/2012 | Pratt | G06Q 30/02 705/37 |
| 8,296,778 | B2* | 10/2012 | Bhogal | G06F 9/546 719/315 |
| 8,321,465 | B2* | 11/2012 | Farber | G06Q 40/00 707/791 |
| 8,346,929 | B1* | 1/2013 | Lai | G06Q 10/10 709/226 |
| 8,402,061 | B1* | 3/2013 | Briggs et al. | 707/791 |
| 8,751,936 | B2* | 6/2014 | Gandhi | G06F 17/3089 715/738 |
| 2002/0023040 | A1* | 2/2002 | Gilman | G06Q 40/04 705/37 |
| 2002/0091615 | A1* | 7/2002 | Salvani | G06Q 40/04 705/37 |
| 2005/0283415 | A1* | 12/2005 | Studnitzer et al. | 705/35 |
| 2006/0015441 | A1* | 1/2006 | Burkhardt | G06Q 30/08 705/37 |
| 2006/0015442 | A1* | 1/2006 | Burkhardt et al. | 705/37 |
| 2006/0020536 | A1* | 1/2006 | Renton et al. | 705/37 |
| 2006/0085320 | A1* | 4/2006 | Owens et al. | 705/37 |
| 2006/0146991 | A1* | 7/2006 | Thompson | G06F 9/542 379/67.1 |
| 2006/0149840 | A1* | 7/2006 | Thompson | H04L 45/24 709/224 |
| 2006/0190386 | A1 | 8/2006 | Levy | |
| 2006/0195383 | A1* | 8/2006 | Masuda | G06Q 40/04 705/37 |
| 2007/0038712 | A1* | 2/2007 | Affronti | G06Q 10/06 709/206 |
| 2007/0271199 | A1* | 11/2007 | Kedia | 705/36 R |
| 2008/0114938 | A1* | 5/2008 | Borgendale | 711/118 |
| 2008/0126476 | A1* | 5/2008 | Nicholas | G06Q 10/10 709/203 |
| 2008/0208734 | A1* | 8/2008 | Kaminsky et al. | 705/37 |
| 2008/0243675 | A1* | 10/2008 | Parsons | G06Q 40/00 705/37 |
| 2009/0019305 | A1 | 1/2009 | Genetski et al. | |
| 2009/0276363 | A1* | 11/2009 | Newhouse | G06Q 40/04 705/80 |
| 2010/0094746 | A1* | 4/2010 | MacGregor | G06Q 40/06 705/37 |
| 2010/0293084 | A1* | 11/2010 | Soubolsky | 705/37 |
| 2011/0178918 | A1* | 7/2011 | Parsons | G06Q 40/04 705/37 |

OTHER PUBLICATIONS

Anonymous, "D: Real-time aggregated datafeeds", Inside Market Data Reference; London (2009), pp. 1-21.*

Anonymous, "R: Enterprise data management solutions", Inside Market Data Reference; London (2009), pp. 1-8.*

Bowie, Max, "HPC Rebrands, Expands Data Solutions", Inside Market Data, London, vol. 25, No. 35, May 31, 2010, pp. 1-3.*

Anonymous, "NYSE Euronext announces innovative software trading solution for US equities", Telcomworldwire, Coventry, Sep. 23, 2008, pp. 1-2.*

Anonymous, "NYSE Technologies: BIDS Trading Selects NYSE Techonologies' SuperFeed for Global Data Feeds—The Fastest, Most Flexible Real-Time Data Delivery Platform", M2 Presswire; Coventry, May 18, 2009, pp. 1-4.*

Anonymous, "Real-Time Innovations; RTI and CSI Partner to Provide High-Performance, Standards-Based Market-Data Solution", Information Technology Newsweekly, Atlanta, Sep. 29, 2009, pp. 1-3.*

Du Trembly, Raymond, "Windows NT and Unix—What's the difference?", Wall Street & Technology; Monmouth Junction, vol. 13, iss 13, Dec. 1995, pp. 1-4 (Year: 1995).*

Anonymous, "NYSE Euronext Advanced Trading Solution Delivers US Equities in a Box", Business Wire; New York, NY, Sep. 22, 2008, pp. 1-4. (Year: 2008).*

"InfoDyne and RTI team on High-Performance Market-Data Platform", Canada Newswire, Ottawa, Nov. 26, 2007, pp. 1-5. (Year: 2007).*

Kakade et al., "Competitive Algorithms for VWAP and Limit Order Trading," Proceedings of the 5th ACM Conference on Electronic Commerce, ACM Digital Library, May 2004: pp. 189-198.

"Financial Transaction Investigation (FTI) Software—Release 5.5," March Networks, Ontario, Canada: pp. 1-11, <http://www.marchnetworks.com/Files/FTI_Application_Note_02-10.pdf>.

William Laurent, "MDDL: The Liberator of Market Data," information management: pp. 1-2, http://www.information-management.com/issues/20050401/1023897-1.html?pg=1>.

"Predictive Straight-Through Processing," TIBCO, Palo Alto, California: pp. 1-10, http://www.tibco.com/multimedia/wp-predictive-straight-through-processing_tcm8-2431.pdf>.

Golan et al., "Temporal Rules Discovery using Datalogic/R+ with Stock Market Data," Proceedings of the International Workshop on Rough Sets and Knowledge Discovery: Rough Sets, Fuzzy Sets and Knowledge Discovery, London: Springer-Verlag, Oct. 1993: pp. 74-81.

* cited by examiner

|  | BID | | ASK | |
|---|---|---|---|---|
| LEVEL | PRICE | QUANTITY | PRICE | QUANTITY |
| 1 | 14.57 | 100 | 14.60 | 250 |
| 2 | 14.55 | 150 | | |

| BID SIDE | | | | |
|---|---|---|---|---|
| INDEX | PRICE | SHARES | ORDERS | mmid |
| 1 | 14.57 | 100 | 0 | 0 |
| 2 | 14.55 | 150 | 0 | 0 |

B)

| ASK SIDE | | | | |
|---|---|---|---|---|
| INDEX | PRICE | SHARES | ORDERS | mmid |
| 1 | 14.60 | 250 | 0 | 0 |

FIG. 5

| BID SIDE | | | | |
|---|---|---|---|---|
| INDEX | PRICE | SHARES | ORDERS | mmid |
| 1 | 14.57 | 100 | 0 | 0 |
| 2 | 0 | 0 | 0 | 0 |
| 3 | 14.54 | 30 | 0 | 0 |
| 4 | 14.53 | 20 | 0 | 0 |

FIG. 6

|  | BID | | ASK | |
|---|---|---|---|---|
| LEVEL | PRICE | QUANTITY | PRICE | QUANTITY |
| 1 | 14.57 | 100 | 14.56 | 20 |
| 2 | 14.55 | 150 | 14.60 | 250 |

FIG. 7

DATA STREAM PROCESSING FRAMEWORK

BACKGROUND

The amount of financial market data has grown exponentially in both breadth and depth over the several years. A wealth of information from financial markets around the world is available to broker-dealers, hedge funds, institutional investors, and so on. This data is typically disseminated using a variety of disparate, proprietary formats.

One common class of data that is available to financial firms is snapshot price level data. This information consists of a stream of data which provides summaries of active orders within particular markets, such as the NYSE's ARCA Europe or the Hong Kong Exchange (HKE). This information is not truly real-time, as it is accumulated and sent on regular time intervals. This strategy of "collect and summarize" results in lower network bandwidth requirements as well as simplifies consumption.

Each snapshot is independent of others. Unlike incremental updates, which occur in real-time and present granular changes in the market as they take place, snapshot data comes at a more controlled place, with less of a risk of missing data, since newer data will always provide a fresh comprehensive picture.

Consumers of this data employ a straightforward approach to process this data: usually a front-end feed handler application is used to retrieve the data from the various snapshot feeds and to transmit them to the consumer's middleware. Typically, these front-end feed handlers use a data structure that can hold a copy of the incoming data, and transmit that data structure to middleware systems configured to provide that information to the interested consumers within the organization.

SUMMARY

Embodiments of the invention provide techniques for processing financial market data streams. One embodiment of the invention provides a method of processing data from a financial market snapshot feed published to a middleware application. The method may generally include retrieving the financial market data from the snapshot feed, the snapshot feed providing price-level data for a plurality of financial instruments, extracting the price-level data for each financial instrument, and associating each financial instrument with a respective transaction, wherein each transaction comprises a plurality of transaction elements. This method may also include storing the price-level data of each financial instrument in respective transaction elements of the respective transaction, generating, from the price-level data stored in each transaction, data characterizing the respective transactions, and converting the transactions and the data characterizing the respective transactions into output messages. This method may also include transmitting the output messages to a middleware application.

Still another embodiment of the invention includes a method for processing a raw financial market data stream. This method may generally include receiving from a snapshot feed a plurality of financial market data for one or more financial instruments, parsing the financial market data to identify a set of bid/ask offers for each of the one or more financial instruments, and sorting the bid/ask offers for each of the one or more financial instruments according to a bid/ask amount in each offer. This method may further include publishing the sorted bid/ask offers for each of the one or more financial instruments for subsequent consumption by a middleware processing application Other embodiments include program products and systems configured to carry out the foregoing methods.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings. Note, however, that the appended drawings illustrate only typical embodiments of this invention and are therefore not to be considered limiting of its scope, for the invention may admit to other equally effective embodiments.

FIGS. 4-7 are tables showing examples of financial snapshot data, according to embodiments of the invention.

DETAILED DESCRIPTION

Figure 1:
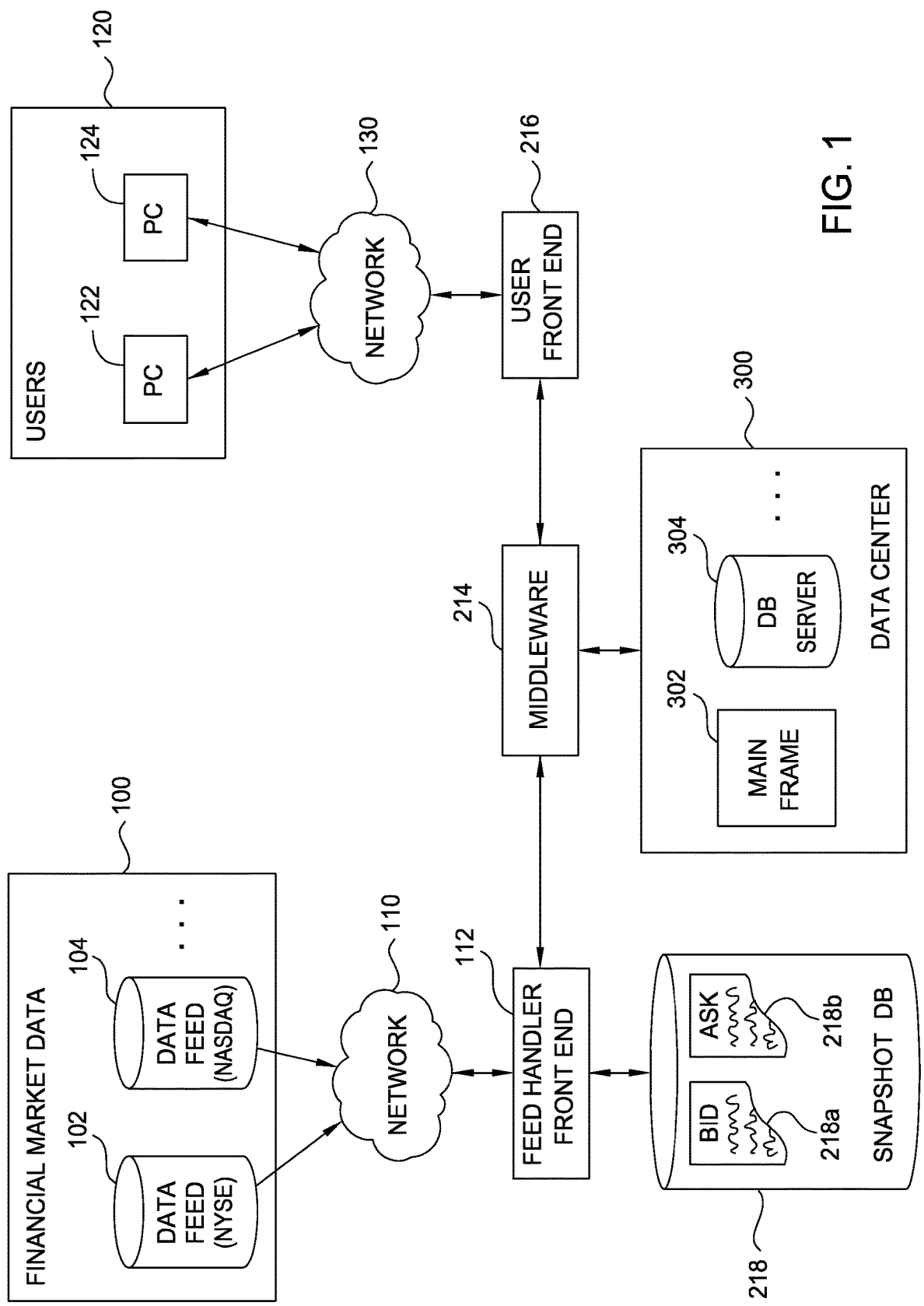
FIG. 1 illustrates an exemplary architecture of a market data delivering platform using a feed handler front-end, according to one embodiment of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, the feed handler front-end and the middleware may be implemented with the cloud and the data feeds of financial market data and the user may only send respective commands to the cloud.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the present invention generally relate to techniques for processing financial market data. More specifically, embodiments of the invention relate to techniques for implementing a font-end feed handler, which provides an interface between price-level snapshot feeds and middleware. As used herein, the term "middleware" generally refers to a computer program (i.e., "application") that receives data or instructions from another application. The application that sends the data or instructions to the middleware may be referred to herein as a "front-end" application. In context of the present invention, e.g., middleware may be an application configured to consume the financial market data processed and published by the feed handler.

FIG. 1 shows a block diagram of an example of a computing platform used to provide access to market-data, according to one embodiment of the invention. As shown, a plurality of snapshot feeds 100 provides financial market data. For example, a first snapshot feed 102 may provide NYSE snapshot data, and a second snapshot feed 102 may provide NASDAQ® snapshot data.

A feed handler front-end application 212 (also referred to herein as "feed handler 212") communicates with the snapshot feeds 100 via a communication network 110 to retrieve the snapshot. For example, the feed handler 212 may be compatible with the Financial Information eXchange (FIX) protocol and may receive the following FIX tags for a given symbol:

```
NoMDEntries = 3
-   MDEntryType = 0 | MDEntryPx = 14.57 | MDEntrySize = 100 |
    MDPriceLevel = 1
-   MDEntryType = 0 | MDEntryPx = 14.55 | MDEntrySize = 150 |
    MDPriceLevel = 2
-   MDEntryType = 1 | MDEntryPx = 14.60 | MDEntrySize = 250 |
    MDPriceLevel = 1
```

In this example, the current symbol are available three entries or price levels (NoMDEntries=3). The tag "MDEntryType" identifies the side of the price level, i.e., "0" for bid (buy) and "1" for ask (sell). The tags "MDEntryPx" and "MDEntrySize" identify the price and the quantity, respectively. Finally, the tag "MDPriceLevel" specifies the price-level of the current entry. FIG. 4 shows for the above example a table summarizing the respective price level data as provided by the snapshot feed 100. In one embodiment, the feed handler 212 parses the snapshot data and converts them into messages, which can be passed to a middleware 214.

The middleware 214 may then receive the feed data from the feed handler 212. For example, the middleware 214 may store the received feed data in a data center 300, which may include various servers, such as main frames 302 or database servers 304. For example, the middleware may comprise a database management system (DBMS), a web-server and/or application servers.

Users 120, such as traders, may then access the data stored in the data center 300. For example, in one embodiment, a plurality of computers, such as user computers 122 and 124, are connected to the middleware 214 via a network 130. A user front-end application 216 may then be installed on an application server of the middleware system (or directly on the user's computer), which provides the access to the feed data. Users can then access the data in parallel with the data storage facility, as well as serially. That is, both users and a storage facility can receive 'real time' data updates simultaneously or a trader can receive historical information from the database.

As mentioned in the foregoing, traditional processing of the snapshot data from the feeds 100 includes applying this incoming data directly to the published output, which is sent to the middleware 214. According to embodiments described herein, a layer of intelligence is added between the incoming feed and outgoing data. This layer analyzes the snapshot data in order to determine value/added information. For example, supplemental data may be derived and/or data quality checks may be performed.

For example, a mechanism may deliver additional information to the middleware systems, track the financial instruments identified in a snapshot and/or maintain the various price levels within those instruments. For example, such additional information, which have not been transmitted by the snapshot feed, may include the total number of price levels available on both the bid side and the ask side of each instrument, the total posted liquidity, and/or the number of market makers contributing to the available prices. Moreover, data inconsistencies may be identified such as missing price levels, incorrectly ordered data and/or "crossed books."

In one embodiment, the feed handler 212 may be configured to organize the incoming snapshot according to price level data. For example, a set of market data messages is identified, and the data elements are accumulated within respective transactions. Specifically, in the following description, a transaction generally refers to a set of price level elements that occur for a specific financial instrument within a market data snapshot sequence, while an individual transaction element is a collection of data primitives that correspond to a given price level of the financial instrument. For example, in one embodiment, a transaction element may be defined by the following data structure:

```
struct TransElement
{
    enumerated side;
    unsigned level;
    float price;
    unsigned quantity;
    unsigned orders;
    string mmid;
}
```

In this example, the parameter "side" is used to set the market side of a transaction, e.g., "0" for bid and "1" for ask. The parameter "level" and "price" may be used to set, respectively, the sorted price level and the price value of the transaction element. For example, the price level may be used directly in its feed native currency. Lastly, the parameter "quantity" identifies the number of shares advertised at the price of the transaction element. Financial market data feeds may also include other fields when publishing price level snapshot data. For example, a parameter "orders" may be used to store the total number of orders active at a give price, and a parameter "mmid" may be used to store the ID of the Market Maker responsible for the price of the transaction element (if this value is provided).

Figure 2:
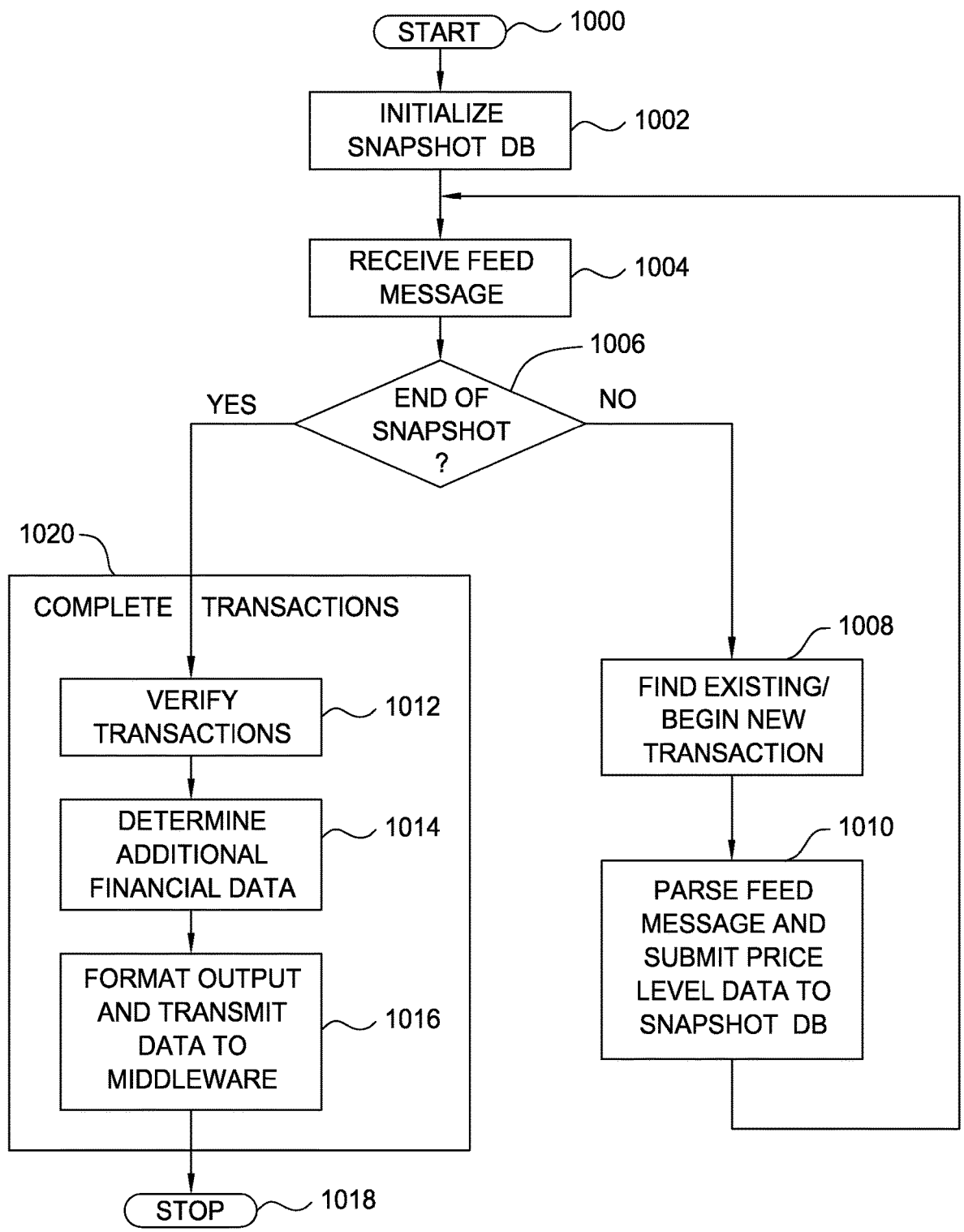
FIG. 2 is a flowchart of one embodiment of a feed handler front-end, which may be used in the scenario of FIG. 1, according to one embodiment of the invention.

FIG. 2 illustrates a flowchart of one embodiment of a feed handler front-end, which may be used in the scenario of FIG. 1, according to one embodiment of the invention. As shown, following step 1000, where the feed frond-end application starts up, an initialization is performed at a step 1002. For example, as part of the initialization, the application may provide access to logging, data storage and publishing facilities. Moreover, during the initialization phase, the feed front-end application may initialize a snapshot database (DB) 218 for storing the various transactions. In this context, the snapshot DB 218 may be stored on a storage media, such as a hard disk drive (HDD), by means of a database management system, such as a relational database management system, or may be managed only temporary within a data structure in the memory of the computing system running the feed front-end handler 212.

For example, in case the transactions are stored within a data structure in the memory, the step 1002 may include acquiring the necessary memory for its storage requirements and setting the data structures to a usable state, e.g.:

SnapshotDB database;
database.initialize(logger, session);

To allow the feed handler front-end to be fully encapsulated, so that it can be decoupled from the middleware and/or normalized data model, a well-defined interface is used to pass that data it generates on to the middleware. In one embodiment, the session parameter may be used for this purpose. More simply, the session parameter represents an object capable of communicating with the middleware.

Once the application has been initialized, the feed front-end application retrieves the snapshot data from one of the data feeds 100. This snapshot data may be provided as a series of message parts, completed by an "end of snapshot" indicator, which indicates the end of the current snapshot for the given data feed 100. For example, at step 1004, the feed handler 212 may receive a feed message, and at step 1006, verifies the content of the feed message. In case the feed message is not a message indicating the end of the snapshot, i.e., output "NO" at step 1006, the application evaluates the content of the message.

For example, in one embodiment, the application searches in the feed message for the value of the symbol of a financial market instrument. Once identified a new transaction is initialized (or an existing transaction is identified) for the financial market instrument re-resented by the symbol (step 1008). That is, the necessary data structures to manage the transaction are created and/or reset. For example, consider the following pseudo-code:

```
string symbol;
string exchange;
SnapshotTransaction transaction = database.beginTransaction( symbol, exchange );
```

In this example, the function "beginTransaction" of the object "database" may create and/or reset a new transaction element for the current symbol "symbol" and the current exchange "exchange," e.g., NYSE or NASDAQ. For example, the function "beginTransaction" may reserve a temporary transaction output object. In one embodiment, the function generates or clears a list of available price level elements "TransElement" for both the bid and the ask market side. For example, two data arrays 218a and 218b may be used to store the price-level data of the bid and the ask market side, respectively. In one embodiment, the data structure of the transaction may include further parameters, such as the maximum bid and ask levels, which are reset to zero at step 1008. Of course, one of ordinary skill in the art will recognize that the variables defined may be tailored to suit the need of an individual case and the example given above is used to merely to illustrate one embodiment.

At step 1010, the complete feed message is then parsed and the respective feed elements are submitted to the transaction as they are parsed from the feed data. For example, this may include extracting from the feed message for the current symbol a series of price-level data and storing the price-level data in respective transaction element, e.g.:

transaction.submitLevel(level, side, price, shares, orders, mmid);

In this example, the function "submitLevel" uses the price level "level" as an index into either the bid-side or ask-side array of TransElements, which is identified by means of the parameter side. The other values of the price-level data, such as "price," "shares," "orders" and "mmid" data, may then be stored at the respective location identified by the price level and the side, i.e., the side is used to determine which array 218a or 218b has to be accessed, while the price-level is used as index of the array. For example, FIGS. 5a and 5b show the data arrays 218a and 218b for the bid and ask side, respectively, for the exemplary feed data of FIG. 4.

Additionally if the submitted level value is greater than the respective maximum bid or ask level, the respective new maximum may be stored. Once the current feed has been parsed at step 1008, the application is ready to receive the next feed message at step 1004. Accordingly, the application will continue to process the feed messages at steps 1004 to 1010 until a message indicating the end of the snapshot is received.

Once a message indicating the end of the snapshot has been found at step 1006, i.e., output "YES" at step 1006, the complete market data snapshot has arrived, and the snapshot data may be published. For example, in the embodiment shown in FIG. 2 the function "completeTransactions" of the object "database" is called in order to complete all transactions within the current snapshot, e.g.:

unsigned long seqnum;
unsigned time;
database.completeTransactions(seqnum, time);

In one embodiment, instead of completing all transactions together at step 1020, each transaction may be completed independently by calling a respective function "completeTransaction" of the object "transaction" directly at step 1010, e.g.:

transaction.completeTransaction(seqnum, time);

In one embodiment, a series of operations may be performed for each completed transaction. For example, at step 1012, price level continuity may be verified. This may include passing through the transaction elements of a transaction in order to verify that there are no gaps in price levels, which would be invalid. For example, the data arrays 218a and 218b shown in FIGS. 5a and 5b do not contain any missing price levels. Conversely, FIG. 6 shows an example of a bid side data array 218a, where the second price-level is missing. As shown in FIG. 6, a missing price-level may be determined by passing through the transaction elements and verifying if the parameter price and/or the parameter quantity are set to zero.

Another operation that may be performed at 1012 includes checking for crossed books. For example, crossed books may be determined by verifying that the price at bid level 1 is greater than, or equal to, the price at ask level 1, i.e., the highest bid level is greater than, or equal to, the lowest ask level. For example, FIG. 7 shows a market situation for a symbol, wherein a crosses book situation exists, because the price at price-level 1 at the bid side is greater than the price at price-level 1 at the ask side.

In one embodiment, in case one of the above verifications generates an error, an error message may be generated, a respective error identifier may be set in the transaction data structure and/or an entry in the log file may be written. For example, a flag may be provided which indicates whether to rollback transactions, which fail an error check. In this case, the transaction may be skipped during publication and e.g., the respective data would not be stored in the data center 300.

At step 1014, data included in a transaction may be processed to determine additional financial information. For example, an aggregate total liquidity at all price levels for bid and ask may be determined and/or the number of unique market maker IDs may be counted. For example, the total liquidity of bid and ask may be determined by passing through the respective data arrays 218a or 218b and accumulating the product of price and quantity of the transaction elements. In this context, total liquidity is an accumulation of quantities, not price*quantity. However, in one embodiment, total share value (accumulated product of price*shares) could be another piece of value-added data. Also average share price (dividing total share value by total liquidity) is additional valuable info that could be generated and provided to the middleware.

In one embodiment, the step 1020 includes also a further step 1016 in which the output is formatted. For example, a cache object may be created which is compatible with the transaction language of the middleware. This cache object may then be populated with the respective bid and ask price level elements. Further, the transaction elements may be published in a sorted order by bid and ask orders/quotes for each symbol. In fact, the organization of the transaction elements in respective arrays 218a and 218b guarantees that the bid and ask orders/quotes are sorted by their price level. The cache object may also include optional data, such as event data including the snapshot sequence number and timestamp, the value added information including e.g., the maximum bid and ask level, the total liquidity, the number of market makers, and/or the error message or flag, or other information as needed in a particular case. Lastly, the cache object is submitted to the middleware for possible re-transmission to the clients 100 and the procedure terminates for the current snapshot at a stop step 1018.

In one embodiment, the feed handler front-end 212 provides also a set of additional interface points. For example, the feed handler front-end 212 may maintain the snapshot data for all transactions in the snapshot DB 218 and provide a function for retrieving the snapshot data of a single symbol like the following:
SnapshotDB::retrieveTransaction(symbol, exch)
Moreover, the feed handler front-end 212 may provide a function for selectively clearing the content of a transaction element like the following:
SnapshotTransaction::clearLevel(level)
The feed handler front-end 212 may also provide a function for retrieving the underlying cache object of a transaction for purposes of adding custom data like the following:
SnapshotTransaction::getCurrentObject( )
Of course one of ordinary skill in the art will recognize that these or other API functions may be implemented to suit the needs of a particular case.

Figure 3:
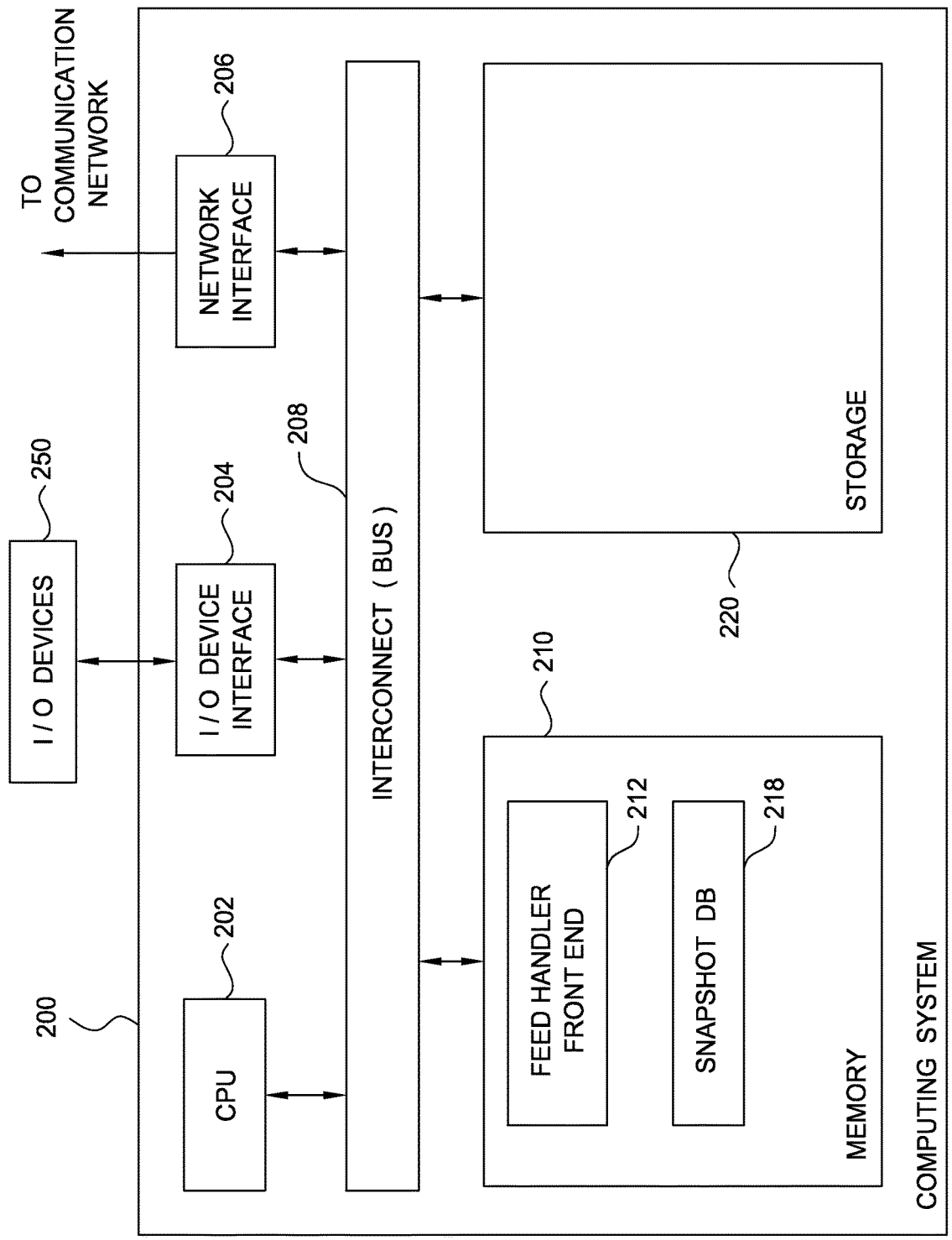
FIG. 3 is a block diagram of a computer system implementing the feed handler front-end first shown in FIG. 2, according to one embodiment of the invention.

FIG. 3 is a block diagram of a computer system implementing the feed handler front-end first shown in FIG. 2, according to one embodiment of the invention. As shown, the computing system 200 includes, without limitation, a central processing unit (CPU) 202, a network interface 206, an interconnect 208, a memory 210, and storage 220. The computing system 200 may also include an I/O device interface 204 connecting I/O devices 250 (e.g., keyboard, display and mouse devices) to the computing system 200.

The CPU 202 retrieves and executes programming instructions stored in the memory 210. Similarly, the CPU 202 stores and retrieves application data residing in the memory 210. The interconnect 208 is used to transmit programming instructions and application data between the CPU 202, I/O devices interface 204, storage 220, network interface 206, and memory 210. CPU 202 is included to be representative of a single CPU, multiple CPUs, a single CPU having multiple processing cores, and the like. And the memory 210 is generally included to be representative of a random access memory.

Illustratively, the memory 210 includes the feed handler front-end application 212 and the snapshot DB 218. As noted above, the feed handler 212 provides an interface between a middleware and at least one snapshot feed, while the snapshot DB is used to store the snapshot data. As mentioned in the foregoing, the snapshot DB 218 may also be stored on a storage media, such as the storage 220. Moreover, although shown as a single unit, the storage 220 may be a combination of fixed and/or removable storage devices, such as fixed disc drives, floppy disc drives, tape drives, removable memory cards, optical storage, network attached storage (NAS), or a storage area-network (SAN).

Of course, one of ordinary skill in the art will recognize that the functionality provided by the components of the feed-handler front-end application 212 and the snapshot DB 218 could be implemented in a variety of ways other than as shown in FIG. 3. Further, the functionality of these components could be distributed across multiple computing systems, e.g., using a variety of available database-services or other distributed computing frameworks. For example, a different feed handler 212 may be used for each data feed 100, wherein each of the feed handlers 212 may be installed on a different computer, thus distributing the workload among different computer systems.

While the foregoing is directed to embodiments of the present invention, other and further embodiments of the invention may be devised without departing from the basic scope thereof, and the scope thereof is determined by the claims that follow.

What is claimed is:

1. A method, in a data processing system, comprising a processor and a memory, the memory comprising instructions that are executed by the processor to cause the processor to implement a financial market data feed handler front end that receives financial market data snapshot data from a financial market data feed source computing system and provides financial market data transaction data to a middleware application, the method comprising:

initializing, by the feed handler front end, a snapshot database for storing transaction data for transactions generated from financial market snapshot data received from the financial market data feed source computing system;

receiving, by the feed handler front end, from the financial market data feed source computing system via at least one data network, the financial market snapshot data, wherein the financial market snapshot data comprises a plurality of message data structures for a plurality of financial market instruments for which there are active orders in a financial market corresponding to the financial market data feed source computing system; and parsing, by the feed handler front end, message data structures of the financial market snapshot data, to identify one or more symbols associated with financial market instruments present in the content of the message data structures;

for each identified symbol associated with a financial market instrument found in the message data structures during parsing of the message data structures:

initializing a transaction data structure for the financial market instrument, wherein the transaction data structure comprises a set of transaction elements, each transaction element corresponding to a price level of the financial market instrument, and wherein the transaction elements are stored in one or more of a first array data structure, in the snapshot database, comprising entries for a bid side of the transaction, and a second array data structure, in the snapshot database, comprising entries for an ask side of the transaction;

processing the message data structures at least by extracting selected portions of the message data structures corresponding to the financial market instrument, and populating the transaction elements of the transaction data structure at least by populating entries of one or more of the first array data structure or the second array data structure with transaction element data from the populated transaction elements, until an end of snapshot message data structure is encountered, wherein the selected portions comprise price-level data for the financial market instrument; and in response to the end of snapshot message data structure being encountered during processing of the message data structures, generating a cache object formatted for a transaction language of the middleware application, populating the cache object with snapshot data from the snapshot database, and outputting the cache object to the middleware application.

2. The method of claim 1, further comprising, in response to the end of snapshot message data structure being encountered during processing of the message data structures, executing by the feed handler front end, for each transaction data structure stored in the snapshot database, a transaction error checking operation on a corresponding first array data structure and a corresponding second array data structure of the transaction data structure to determine if any errors are present in the transaction data structure.

3. The method of claim 2, wherein populating the cache object with snapshot data from the snapshot database comprises populating the cache object with entries from the first array data structure and the second array data structure of transaction data structures in the snapshot database that are not associated with an error condition by the transaction error checking operation, and wherein transaction data structures that are associated with an error condition are skipped during populating the cache object.

4. The method of claim 2, further comprising:
outputting, by the middleware application, the cache object data to one or more user computing devices, wherein the cache object data comprises data from only transaction data structures that are not associated with an error condition.

5. The method of claim 1, wherein receiving the financial market snapshot data further comprises parsing, by the feed handler front end, the financial market snapshot data and converting price-level data in the snapshot data to the plurality of message data structures based on the parsing of the financial market snapshot data.

6. The method of claim 1, wherein transaction elements corresponding to the bid side of the transaction are stored in entries of the first array data structure, indexed by price-level, in a first sequential order according to price-level associated with each transaction element corresponding to the bid side in set of the transaction elements, and wherein transaction elements corresponding to the ask side of the transaction are stored in entries of the second array data structure, indexed by price-level, in a second sequential order according to price-level associated with each transaction element corresponding to the ask side in set of the transaction elements.

7. The method of claim 6, wherein entries of the first array data structure and entries in the second array data structure that are not populated with transaction element data from the set of transaction elements indicate missing price-level data for the transaction corresponding to the financial market instrument, and wherein, in response to there being missing price-level data for the transaction corresponding to the financial market instrument, the feed handler front end marks the transaction data structure corresponding to the transaction as having an error condition.

8. The method of claim 6, further comprising:
executing, by the feed handler front end, a transaction error check operation on the first array data structure and the second array data structure by comparing entries in the first array data structure and the second array data structure at each price-level to verify that a price value at the price-level in entries of the first array are greater than or equal to a price value at the price-level in entries of the second array; and
in response to the verification failing for any price-level, marking, by the feed handler front end, the transaction data structure as having an error condition.

9. The method of claim 1, wherein each transaction element in the set of transaction elements comprises a plurality of data primitives comprising a price-level, a transaction side indicator that indicates whether the transaction element corresponds to an ask side or a bid side of the transaction, a price value, a number of shares, a number of orders, and a market maker identifier, and wherein the data primitives of each transaction element in the set of transaction elements are processed by the feed handler front end to perform at least one of generating derived transaction metrics or performing transaction error checking operations.

10. The method of claim 1, wherein the data primitives of each transaction element in the set of transaction elements are processed by the feed handler front end to generate derived transaction metrics, and wherein generating derived transaction metrics comprises at least one of determining, and storing as part of the transaction data structure, an aggregate total liquidity at all price levels for a bid side and ask side of the transaction, or determining, and storing as part of the transaction data structure, a number of unique market maker identifiers associated with the transaction, and wherein the derived transaction metrics are used to populate the cache object.

11. The method of claim 1, wherein the snapshot database stores transaction data structures for a plurality of transactions, and wherein the feed handler front end comprises an interface for specifying a single symbol associated with a financial market instrument and retrieving, from the snapshot database, transaction element data of transaction data structures associated with the financial market instrument corresponding to the specified single symbol.

12. A computer program product comprising a non-transitory computer readable medium having a computer readable program stored therein, wherein the computer readable program, when executed on a computing device, causes the computing device to implement a financial market data feed handler front end that receives financial market data snapshot data from a financial market data feed source computing system and provides financial market data transaction data to a middleware application, the feed handler front end operating to:

initialize a snapshot database for storing transaction data for transactions generated from financial market snapshot data received from the financial market data feed source computing system;

receive, from the financial market data feed source computing system via at least one data network, the financial market snapshot data, wherein the financial market snapshot data comprises a plurality of message data structures for a plurality of financial market instruments for which there are active orders in a financial market corresponding to the financial market data feed source computing system;

parse message data structures of the financial market snapshot data, to identify one or more symbols associated with financial market instruments present in the content of the message data structures;

for each identified symbol associated with a financial market instrument found in the message data structures during parsing of the message data structures:

initialize a transaction data structure for the financial market instrument, wherein the transaction data structure comprises a set of transaction elements, each transaction element corresponding to a price level of the financial market instrument, and wherein the transaction elements are stored in one or more of a first array data structure, in the snapshot database, comprising entries for a bid side of the transaction, and a second array data structure, in the snapshot database, comprising entries for an ask side of the transaction;

process the message data structures at least by extracting selected portions of the message data structures corresponding to the financial market instrument, and populating the transaction elements of the transaction data structure at least by populating entries of one or more of the first array data structure or the second array data structure with transaction element data from the populated transaction elements, until an end of snapshot message data structure is encountered, wherein the selected portions comprise price-level data for the financial market instrument; and in response to the end of snapshot message data structure being encountered during processing of the message data structures, generate a cache object formatted for a transaction language of the middleware application, populating the cache object with snapshot data from the snapshot database, and output the cache object to the middleware application.

13. The computer program product of claim 12, wherein the computer readable program further causes the feed handler front end to execute, in response to the end of snapshot message data structure being encountered during processing of the message data structures, for each transaction data structure stored in the snapshot database, a transaction error checking operation on a corresponding first array data structure and a corresponding second array data structure of the transaction data structure to determine if any errors are present in the transaction data structure.

14. The computer program product of claim 13, wherein populating the cache object with snapshot data from the snapshot database comprises populating the cache object with entries from the first array data structure and the second array data structure of transaction data structures in the snapshot database that are not associated with an error condition by the transaction error checking operation, and wherein transaction data structures that are associated with an error condition are skipped during populating the cache object.

15. The computer program product of claim 13, wherein the middleware application outputs the cache object data to one or more user computing devices, wherein the cache object data comprises data from only transaction data structures that are not associated with an error condition.

16. The computer program product of claim 12, wherein receiving the financial market snapshot data further comprises parsing, by the feed handler front end, the financial market snapshot data and converting price-level data in the snapshot data to the plurality of message data structures based on the parsing of the financial market snapshot data.

17. The computer program product of claim 12, wherein transaction elements corresponding to the bid side of the transaction are stored in entries of the first array data structure, indexed by price-level, in a first sequential order according to price-level associated with each transaction element corresponding to the bid side in set of the transaction elements, and wherein transaction elements corresponding to the ask side of the transaction are stored in entries of the second array data structure, indexed by price-level, in a second sequential order according to price-level associated with each transaction element corresponding to the ask side in set of the transaction elements.

18. The computer program product of claim 17, wherein entries of the first array data structure and entries in the second array data structure that are not populated with transaction element data from the set of transaction elements indicate missing price-level data for the transaction corresponding to the financial market instrument, and wherein, in response to there being missing price-level data for the transaction corresponding to the financial market instrument, the feed handler front end marks the transaction data structure corresponding to the transaction as having an error condition.

19. The computer program product of claim 17, wherein the feed handler front end further operates to:

execute a transaction error check operation on the first array data structure and the second array data structure by comparing entries in the first array data structure and the second array data structure at each price-level to verify that a price value at the price-level in entries of the first array are greater than or equal to a price value at the price-level in entries of the second array; and in response to the verification failing for any price-level, mark the transaction data structure as having an error condition.

20. The computer program product of claim 12, wherein each transaction element in the set of transaction elements comprises a plurality of data primitives comprising a price-level, a transaction side indicator that indicates whether the transaction element corresponds to an ask side or a bid side of the transaction, a price value, a number of shares, a number of orders, and a market maker identifier, and wherein the data primitives of each transaction element in the set of transaction elements are processed by the feed handler front end to perform at least one of generating derived transaction metrics or performing transaction error checking operations.

21. The computer program product of claim 12, wherein the data primitives of each transaction element in the set of transaction elements are processed by the feed handler front end to generate derived transaction metrics, and wherein generating derived transaction metrics comprises at least one of determining, and storing as part of the transaction data structure, an aggregate total liquidity at all price levels for a bid side and ask side of the transaction, or determining, and storing as part of the transaction data structure, a number of unique market maker identifiers associated with the transaction, and wherein the derived transaction metrics are used to populate the cache object.

22. The computer program product of claim 12, wherein the snapshot database stores transaction data structures for a plurality of transactions, and wherein the feed handler front end comprises an interface for specifying a single symbol associated with a financial market instrument and retrieving, from the snapshot database, transaction element data of transaction data structures associated with the financial market instrument corresponding to the specified single symbol.

23. An apparatus comprising:
a processor; and
a memory coupled to the processor, wherein the memory comprises instructions which, when executed by the processor, cause the processor to implement a financial market data feed handler front end that receives financial market data snapshot data from a financial market data feed source computing system and provides financial market data transaction data to a middleware application, the feed handler front end operating to:
  initialize a snapshot database for storing transaction data for transactions generated from financial market snapshot data received from the financial market data feed source computing system;
  receive, from the financial market data feed source computing system via at least one data network, the financial market snapshot data, wherein the financial market snapshot data comprises a plurality of message data structures for a plurality of financial market instruments for which there are active orders in a financial market corresponding to the financial market data feed source computing system;
  parse message data structures of the financial market snapshot data, to identify one or more symbols associated with financial market instruments present in the content of the message data structures;
  for each identified symbol associated with a financial market instrument found in the message data structures during parsing of the message data structures:
    initialize a transaction data structure for the financial market instrument, wherein the transaction data structure comprises a set of transaction elements, each transaction element corresponding to a price level of the financial market instrument, and wherein the transaction elements are stored in one or more of a first array data structure, in the snapshot database, comprising entries for a bid side of the transaction, and a second array data structure, in the snapshot database, comprising entries for an ask side of the transaction;
    process the message data structures at least by extracting selected portions of the message data structures corresponding to the financial market instrument, and populating the transaction elements of the transaction data structure at least by populating entries of one or more of the first array data structure or the second array data structure with transaction element data from the populated transaction elements, until an end of snapshot message data structure is encountered, wherein the selected portions comprise price-level data for the financial market instrument; and
  in response to the end of snapshot message data structure being encountered during processing of the message data structures, generate a cache object formatted for a transaction language of the middleware application, populating the cache object with snapshot data from the snapshot database, and output the cache object to the middleware application.

\* \* \* \* \*